United States Patent
Horng et al.

(10) Patent No.: US 11,081,926 B2
(45) Date of Patent: Aug. 3, 2021

(54) INNER-ROTOR MOTOR AND STATOR THEREOF

(71) Applicant: Sunonwealth Electric Machine Industry Co., Ltd., Kaohsiung (TW)

(72) Inventors: Alex Horng, Kaohsiung (TW); Tso-Kuo Yin, Kaohsiung (TW); Duo-Nian Shan, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 16/712,343

(22) Filed: Dec. 12, 2019

(65) Prior Publication Data

US 2020/0119611 A1    Apr. 16, 2020

Related U.S. Application Data

(63) Continuation-in-part of application No. 15/655,962, filed on Jul. 21, 2017, now abandoned.

(30) Foreign Application Priority Data

Sep. 1, 2016  (TW) ................................ 105128294

(51) Int. Cl.
*H02K 3/52* (2006.01)
*H02K 3/28* (2006.01)
(Continued)

(52) U.S. Cl.
CPC ............. *H02K 3/522* (2013.01); *H02K 1/146* (2013.01); *H02K 1/165* (2013.01); *H02K 1/28* (2013.01); *H02K 3/28* (2013.01); *H02K 3/48* (2013.01)

(58) Field of Classification Search
CPC ............ H02K 1/12; H02K 1/14; H02K 1/141; H02K 1/143; H02K 1/145; H02K 1/146;
(Continued)

(56) References Cited

U.S. PATENT DOCUMENTS 4,301,887 A * 11/1981 Fiske, Jr. ................. G01V 1/26
                                                    181/107
7,242,128 B2   7/2007 Innami et al.
(Continued)

FOREIGN PATENT DOCUMENTS

| CN | 203554204 U | 4/2014 |
| TW | M490163 | 11/2014 |

*Primary Examiner* — Tran N Nguyen
*Assistant Examiner* — Alexander A Singh
(74) *Attorney, Agent, or Firm* — Alan D. Kamrath; Karin L. Williams; Mayer & Williams PC (57) ABSTRACT

An inner-rotor motor including a housing, a stator and a rotor avoids damage to the coil unit which often occurs during assembly of the conventional inner-rotor motor. The housing has an inner periphery provided with a plurality of protrusions. The iron core has an outer periphery provided with a plurality of notches. The insulating sleeve includes a plurality of positioning members. In radial directions perpendicular to the shaft, each of the plurality of notches is spaced from a center of a shaft at a minimal distance, and each of the plurality of positioning members is spaced from the center of the shaft at a maximal distance. The maximal distance is smaller than the minimal distance.

12 Claims, 7 Drawing Sheets

(51) Int. Cl.
*H02K 1/14* (2006.01)
*H02K 1/28* (2006.01)
*H02K 1/16* (2006.01)
*H02K 3/48* (2006.01)

(58) Field of Classification Search
CPC .......... H02K 1/148; H02K 1/18; H02K 1/185; H02K 1/27; H02K 1/2706; H02K 3/34; H02K 3/345; H02K 3/325; H02K 3/46; H02K 3/50; H02K 3/52; H02K 5/00; H02K 5/02; H02K 5/04; H02K 5/06; H02K 5/08; H02K 5/24; H02K 5/225; H02K 5/1732; H02K 3/522; H02K 3/28; H02K 3/48; H02K 1/28; H02K 1/165
USPC ............ 310/214, 215, 89, 216.001, 216.085, 310/216.086, 216.088, 216.098, 216.126, 310/413, 179, 180, 184, 208
See application file for complete search history.

(56) References Cited

U.S. PATENT DOCUMENTS

| | | |
|---|---|---|
| 7,268,459 B2 | 9/2007 | Baba et al. |
| 7,453,179 B2 | 11/2008 | Innami et al. |
| 9,343,334 B2 | 5/2016 | Hoffman et al. |
| 2006/0012262 A1* | 1/2006 | Baba ...................... H02K 1/185 310/216.067 |
| 2013/0313921 A1* | 11/2013 | Hoffman ................ H02K 1/148 310/43 |

\* cited by examiner

INNER-ROTOR MOTOR AND STATOR THEREOF

CROSS REFERENCE TO RELATED APPLICATIONS

The application claims the benefit of Taiwan application serial No. 105128294, filed on Sep. 1, 2016, and the subject matter of which is incorporated herein by reference.

This is a continuation-in-part application of U.S. patent application Ser. No. 15/655,962 filed on Jul. 21, 2017, and the entire contents of which are incorporated herein by reference.

BACKGROUND OF THE INVENTION

1. Field of the Invention

The present invention generally relates to a motor and, more particularly, to an inner-rotor motor and a stator thereof.

2. Description of the Related Art

An inner-rotor motor generally includes a housing, a stator and a rotor. The stator is mounted in the housing. The rotor is rotatably coupled with the housing via a shaft. The rotor includes a magnet portion mounted at the center of the stator for magnetic conduction purposes.

Figure 1:
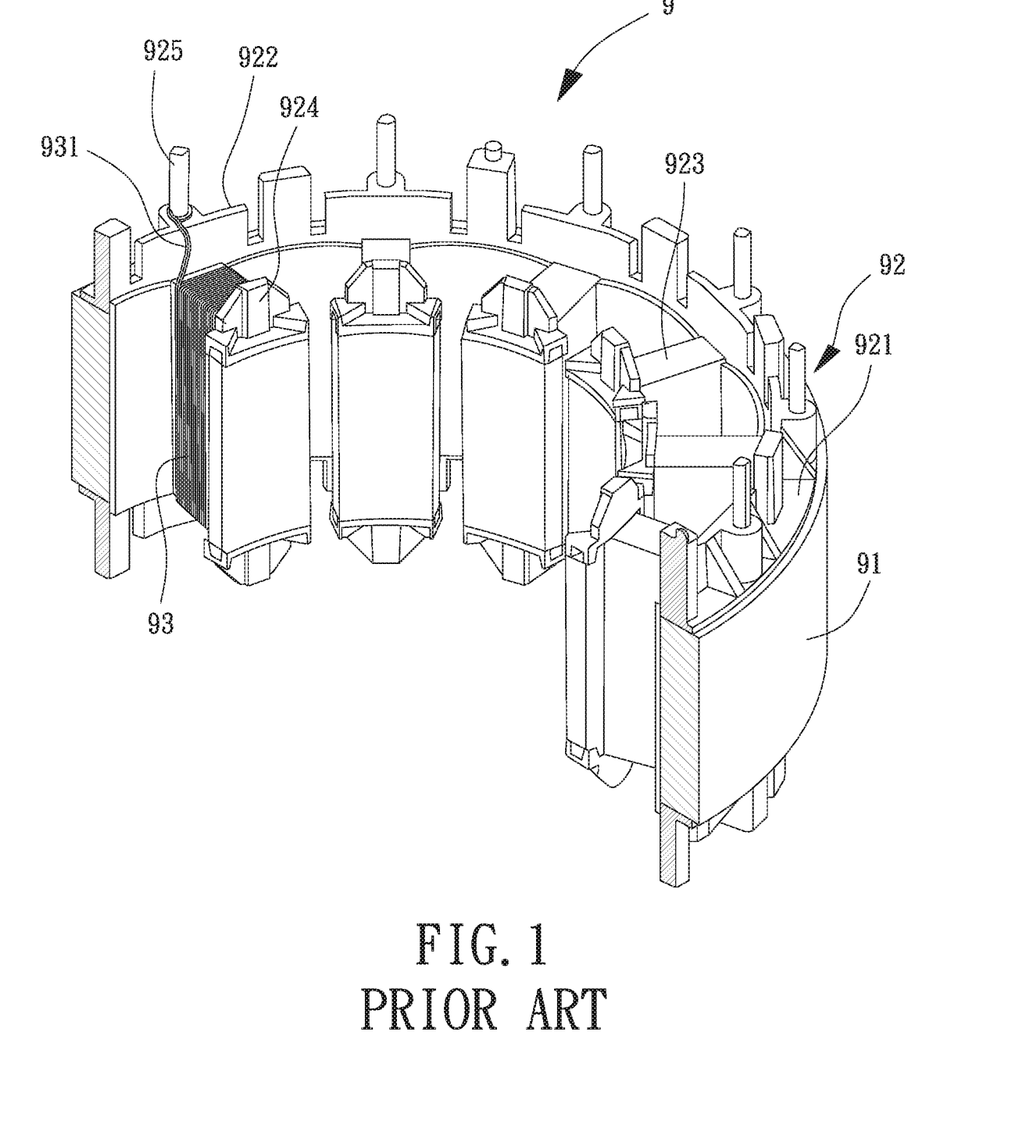
FIG. 1 is a partial view of a conventional stator of an inner-rotor motor.

FIG. 1 is a partial view of a conventional stator 9 of an inner-rotor motor. The conventional stator 9 includes an iron core 91, an insulating winding frame 92 and a coil unit 93. The insulating winding frame 92 includes a ring 921 connected to the top face of the iron core 91. A plurality of outer fence plates 922 is annularly arranged on the inner edge of the top face of the ring 921. A plurality of covering members 923 is respectively connected to the outer fence plates 922. Each of the covering members 923 covers the top faces of the tooth portion and the boot portion of the iron core 91. A plurality of inner fence plates 924 is respectively connected to the plurality of covering members 923, and respectively faces the plurality of outer fence plates 922. A plurality of pins 925 is mounted on the top face of the ring 921, and is located outwardly of the plurality of outer fence plates 922 respectively. Based on the arrangement, at least one enameled copper wire 931 can be wound around the covering members 923, and the end of the enameled copper wire 931 is fixed to the pin 925. An example of such a conventional stator 9 is disclosed in Taiwan Patent No. M490163.

However, since the plurality of pins 925 is located outwardly of the plurality of outer fence plates 922, the enameled copper wire 931 of the pin 925 is very close to the outer periphery of the stator 9. Therefore, when the stator 9 is inserted into the housing, the enameled copper wire 931 may be scratched by the housing. This leads to an abnormal operation of the inner-rotor motor. Due to this reason, special care should be taken during assembly of the motor, leading to difficulty in improving assembly efficiency.

In some inner-rotor motors, in order to improve the coupling strength between the stator and the housing, the motor includes a plurality of protrusions on the inner periphery of the housing, as well as a plurality of notches on the outer periphery of the iron core into which the plurality of protrusions can be respectively engaged. However, this structure increases the coupling area between the housing and the stator, so that the enameled copper wire is more likely to get scratched by the housing. Furthermore, the protrusions of the housing are closer to the enameled copper wire in this type of motor, so that the above scratching event is even more likely to occur in the motor during assembly. Thus, it is necessary to improve the motor and the stator thereof.

SUMMARY OF THE INVENTION

It is therefore the objective of this invention to provide an inner-rotor motor and a stator thereof. In the motor, the insulating sleeve of the stator is provided with at least one positioning member to which the enameled copper wire(s) can be fixed. Thus, it can be ensured that the enameled copper wire(s) is spaced from the outer periphery of the stator at a sufficient distance to reduce the scratching of the enameled copper wire(s) during assembly of the motor.

In an aspect, an inner-rotor motor includes a housing, a stator and a rotor. The housing has an inner periphery provided with a plurality of protrusions. The stator is received in the housing and includes an iron core, an insulating sleeve and a coil unit. The iron core is in an annular form and has a central hole. The iron core has an outer periphery provided with a plurality of notches. The plurality of protrusions is capable of extending into the plurality of notches respectively. The insulating sleeve is coupled with the iron core and includes a plurality of positioning members. At least one enameled copper wire is wound around the insulating sleeve to form the coil unit. Each of the at least one enameled copper wire is fixed to one of the plurality of positioning members. The rotor is rotatably coupled with the housing via a shaft and includes a magnet portion received in the central hole. In radial directions perpendicular to the shaft, each of the plurality of notches is spaced from a center of the shaft at a minimal distance, and each of the plurality of positioning members is spaced from the center of the shaft at a maximal distance. The maximal distance is smaller than the minimal distance. The iron core forms a magnetic conduction face at an inner periphery thereof. The iron core includes a plurality of pole portions located between the magnetic conduction face and the plurality of notches. The insulating sleeve covers the plurality of pole portions. The at least one enameled copper wire is wound around the insulating sleeve to form the coil unit aligned with the plurality of pole portions. The magnetic conduction face is in an uncovered state. The magnetic conduction face faces the magnet portion of the rotor. The iron core includes two ends spaced from each other in an axial direction of the iron core. The insulating sleeve includes a plurality of inner walls and a plurality of outer walls. One of the plurality of inner walls and one of the plurality of outer walls are arranged for each of the plurality of pole portions at one or each of the two ends of the iron core. Each inner wall is closer to the central hole than each outer wall is to the central hole. The plurality of positioning members is located between the plurality of inner walls and the plurality of outer walls. Each of the plurality of notches includes a bottom wall having a part most adjacent to the central hole and first and second sides extending from opposite ends of the part of the bottom wall extending outward of the central hole. Each outer wall is contiguous with the part of the bottom wall of a respective one of the plurality of notches.

In a form shown, each of the plurality of notches is aligned with a respective one of the plurality of pole portions in a radial direction perpendicular to an axial direction of the central hole.

In the form shown, the plurality of positioning members is arranged on the plurality of outer walls, respectively.

In the form shown, the iron core includes a plurality of core units. Each of the plurality of core units includes a boot portion, a magnetic yoke portion, and one of the plurality of pole portions. The boot portion, the one of the plurality of pole portions and the magnetic yoke portion are connected in series in a radial direction perpendicular to the axial direction of the central hole. Each inner wall of the insulating sleeve is located on the boot portion. Each outer wall is located on the magnetic yoke portion.

In the form shown, each of the plurality of positioning members of the insulating sleeve is located on the magnetic yoke portion of a respective one of the plurality of core units.

In the form shown, the housing includes a shaft hole. The shaft of the rotor extends through the shaft hole. The plurality of protrusions is spaced from each other in intervals and extends in parallel to the axial direction of the shaft hole. The plurality of notches extends in parallel to an axial direction of the central hole.

In another aspect, a stator includes an iron core, an insulating sleeve and a coil unit. The iron core has an annular form and a central hole. The iron core has an outer periphery forming a plurality of notches. The insulating sleeve is coupled with the iron core and has a plurality of positioning members. The coil unit is formed by at least one enameled copper wire wound around the insulating sleeve. Each of the at least one enameled copper wire is fixed to one of the plurality of positioning members. In radial directions perpendicular to the central hole, each of the plurality of notches is spaced from a center of the central hole at a minimal distance, and each of the plurality of positioning members is spaced from the center of the central hole at a maximal distance. The maximal distance is smaller than the minimal distance. The iron core forms a magnetic conduction face at an inner periphery thereof. The iron core includes a plurality of pole portions located between the magnetic conduction face and the plurality of notches. The insulating sleeve covers the plurality of pole portions. The at least one enameled copper wire is wound around the insulating sleeve to form the coil unit that is aligned with the plurality of pole portions. The magnetic conduction face is in an uncovered state. The iron core includes two ends spaced from each other in an axial direction of the iron core. The insulating sleeve includes a plurality of inner walls and a plurality of outer walls. One of the plurality of inner walls and one of the plurality of outer walls are arranged for each of the plurality of pole portions at one or each of the two ends of the iron core. Each inner wall is closer to the central hole than each outer wall is to the central hole. The plurality of positioning members is located between the plurality of inner walls and the plurality of outer walls. Each of the plurality of notches includes a bottom wall having a part most adjacent to the central hole and first and second sides extending from opposite ends of the part of the bottom wall extending outward of the central hole. Each outer wall is contiguous with the part of the bottom wall of a respective one of the plurality of notches.

In a form shown, each of the plurality of notches is aligned with a respective one of the plurality of pole portions in a radial direction perpendicular to an axial direction of the central hole.

In the form shown, the plurality of positioning members is arranged on the plurality of outer walls, respectively.

In the form shown, the iron core includes a plurality of core units. Each of the plurality of core units includes a boot portion, a magnetic yoke portion, and one of the plurality of pole portions. The boot portion, the one of the plurality of pole portions, and the magnetic yoke portion are connected in series in a radial direction perpendicular to the axial direction of the central hole. Each inner wall of the insulating sleeve is located on the boot portion, and each outer wall is located on the magnetic yoke portion.

In the form shown, each of the plurality of positioning members of the insulating sleeve is located on the magnetic yoke portion of a respective one of the plurality of core units.

In the form shown, the plurality of notches extends in parallel to an axial direction of the central hole.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

In the various figures of the drawings, the same numerals designate the same or similar parts. Furthermore, when the terms "first", "second", "inner", "outer", "top" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 2:
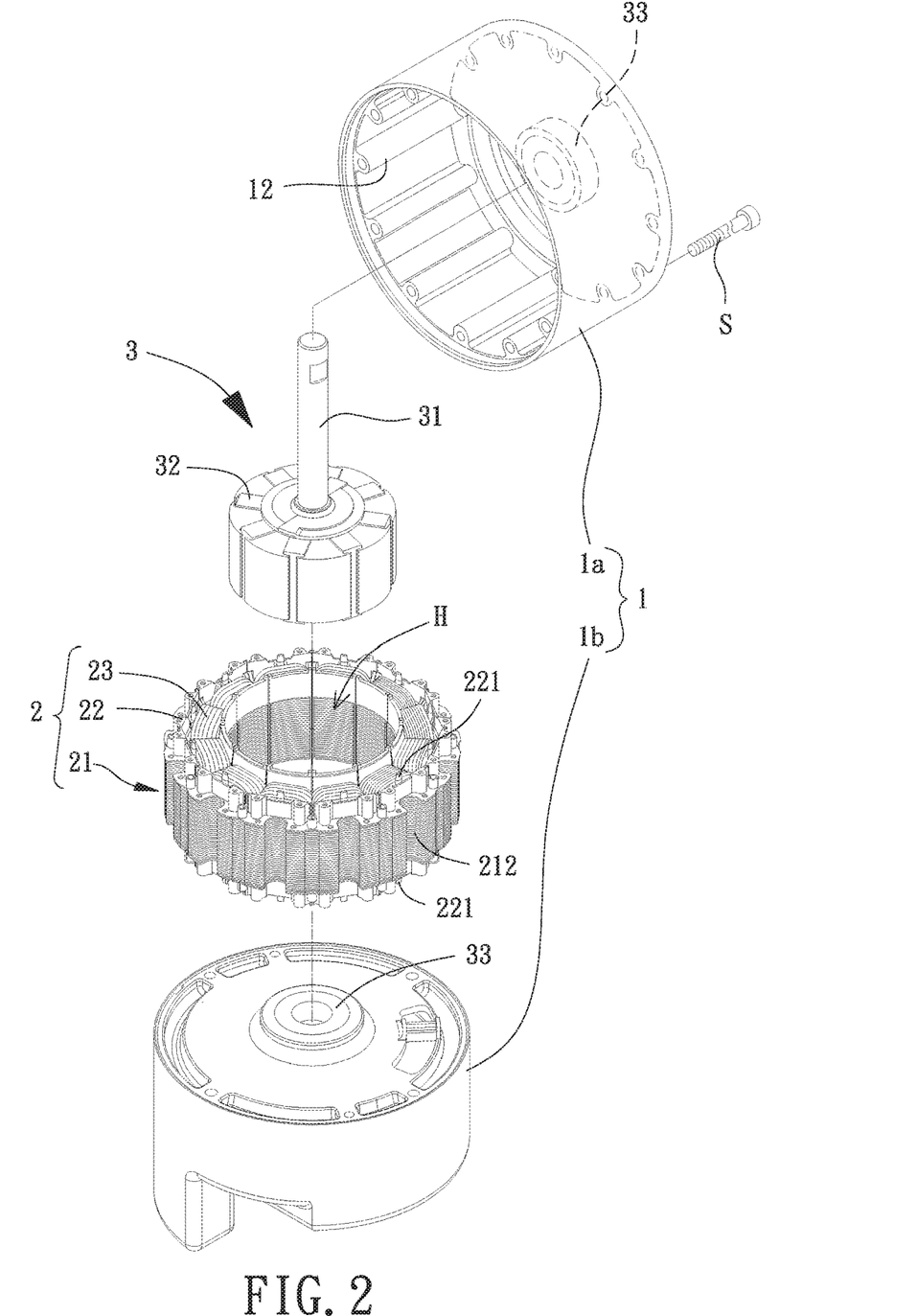
FIG. 2 is an exploded view of an inner-rotor motor according to an embodiment of the invention.
Figure 4:
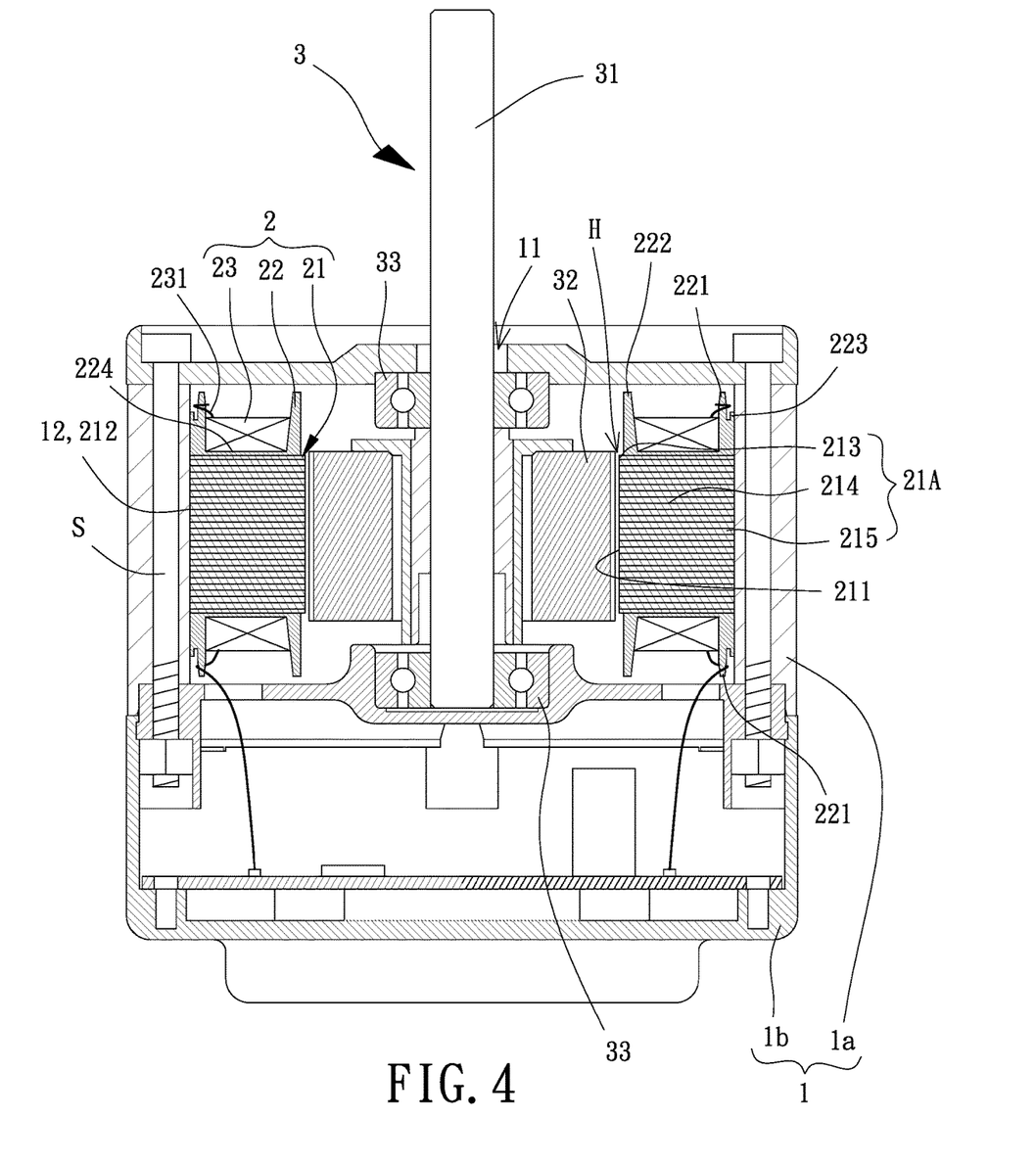
FIG. 4 is a longitudinal, cross sectional view of the inner-rotor motor of the embodiment of the invention.

FIGS. 2 and 4 show an inner-rotor motor according to an embodiment of the invention. The motor generally includes a housing 1, a stator 2 and a rotor 3. The stator 2 is received in the housing 1. The rotor 3 is partially received in the housing 1.

In the embodiment, the housing 1 includes a first housing part 1a and a second housing part 1b. The stator 2 includes an iron core 21, an insulating sleeve 22 and a coil unit 23. The iron core 21, the insulating sleeve 22 and the coil unit 23 and a part of the rotor 3 are received in the first housing part 1a. The first housing part 1a and the second housing part 1b can be combined with each other.

Specifically, the first housing part 1a includes an end portion distant to the second housing part 1b. The end portion is provided with a shaft hole 11 through which a shaft 31 of the rotor 3 can extend. A plurality of protrusions 12 is arranged on an inner periphery of the first housing part 1a. The protrusions 12 are spaced from each other in intervals and extend in parallel to an axial direction of the shaft hole 11. During assembly of the housing 1, a plurality of screwing members S can respectively extend through the plurality of protrusions 12 and is screwed to the second housing part 1b. As such, the first housing part 1a and the second housing part 1b can be combined with each other. The first housing part 1a and the second housing part 1b can also be combined with each other by way of engagement or welding.

Figure 3:
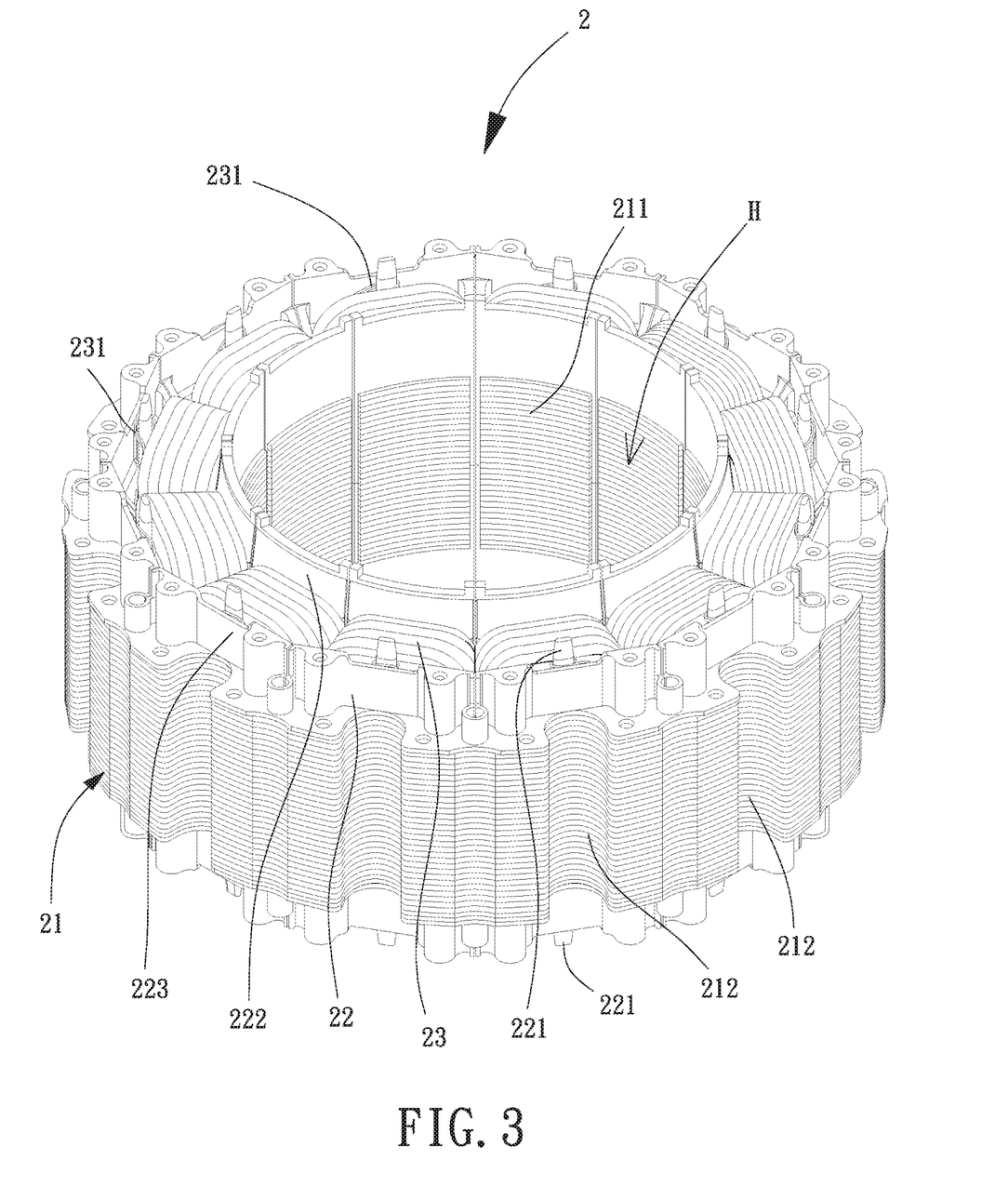
FIG. 3 shows a stator of the inner-rotor motor of the embodiment of the invention.
Figure 5:
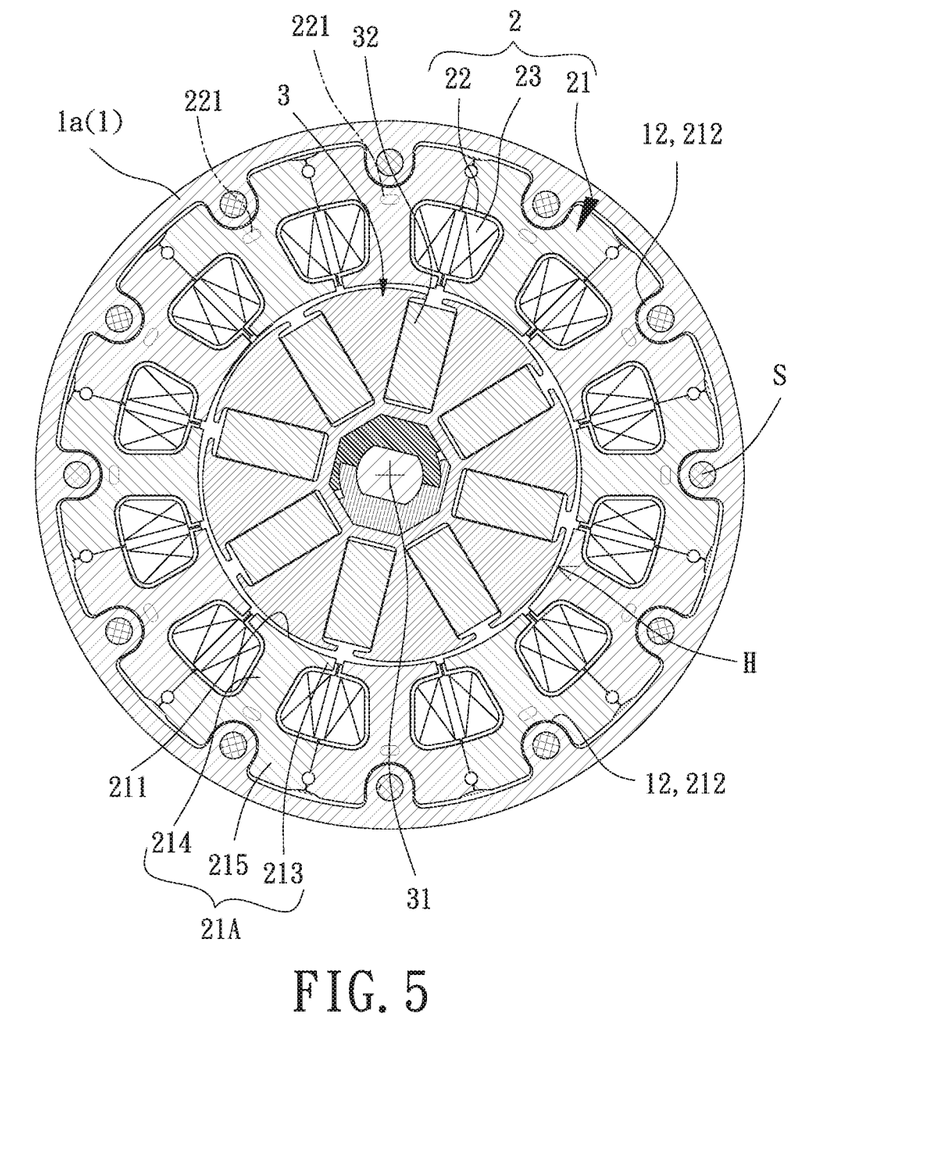
FIG. 5 is a transverse, cross sectional view of the inner-rotor motor of the embodiment.

The iron core 21 of the stator 2 is in an annular form and has a central hole H. A magnet portion 32 of the rotor 3 is received in the central hole H. Referring to FIGS. 3 and 5, the inner periphery of the iron core 21 forms a magnetic conduction face 211, and the outer periphery of the iron core 21 forms a plurality of notches 212 extending inwardly of the iron core 21. Each of the notches 212 extends in an axial direction of the central hole H, and has a size equal to or slightly larger than that of a respective protrusion 12 of the housing 1. Thus, when the iron core 21 is combined with the first housing part 1a of the housing 1, the protrusions 12 can respectively extend into the notches 212, preventing the rotation of the iron core 21 relative to the first housing part 1a. As such, the assembly of other components can be more convenient, improving the coupling effect between the stator 2 and the housing 1. In a preferred case, the iron core 21 includes a plurality of core units 21A. Each of the core units 21A includes a boot portion 213, a pole portion 214 and a magnetic yoke portion 215. The boot portion 213, the pole portion 214 and the magnetic yoke portion 215 are connected in series in a radial direction perpendicular to the axial direction of the central hole H. Each of the core units 21A includes a surface facing the central hole H, and said surfaces of the core units 21A jointly form the magnetic conduction face 211. The magnetic yoke portions 215 of the core units 21A are connected to each other annularly. The magnetic yoke portion 215 includes a surface distant to the central hole H, and said surfaces of the core units 21A jointly form the outer periphery of the iron core 21. Each of the notches 212 is formed on the magnetic yoke portion 215 of a respective core unit 21A. As such, the pole portion 214 of the core unit 21A is located between the magnetic conduction face 211 and the notch 212. The notch 212 may align with the pole portion 214 in a radial direction perpendicular to the axial direction of the central hole H, to prevent the iron core 21 from having insufficient structural strength in certain parts.

Referring to FIGS. 3 and 4, the insulating sleeve 22 may be attached to the iron core 21, or may be integrally formed with the iron core 21 by injection molding. The insulating sleeve 22 is used to separate the iron core 21 from the coil unit 23. The insulating sleeve 22 covers the pole portions 214 of the iron core 21, such that at least one enameled copper wire can be wound around the insulating sleeve 22 to form the coil unit 23 substantially aligned with the pole portions 214. The insulating sleeve 22 further includes a plurality of positioning members 221 to which the at least one enameled copper wire can be fixed, thus providing a smooth winding operation. The plurality of positioning members 221 is electrically insulative to avoid short-circuiting of the motor. Furthermore, the insulating sleeve 22 can maintain the magnetic conduction face 211 in an uncovered state, so that the magnet portion 32 in the central hole H can face the magnetic conduction face 211 for inducing magnetic field.

Figure 7:
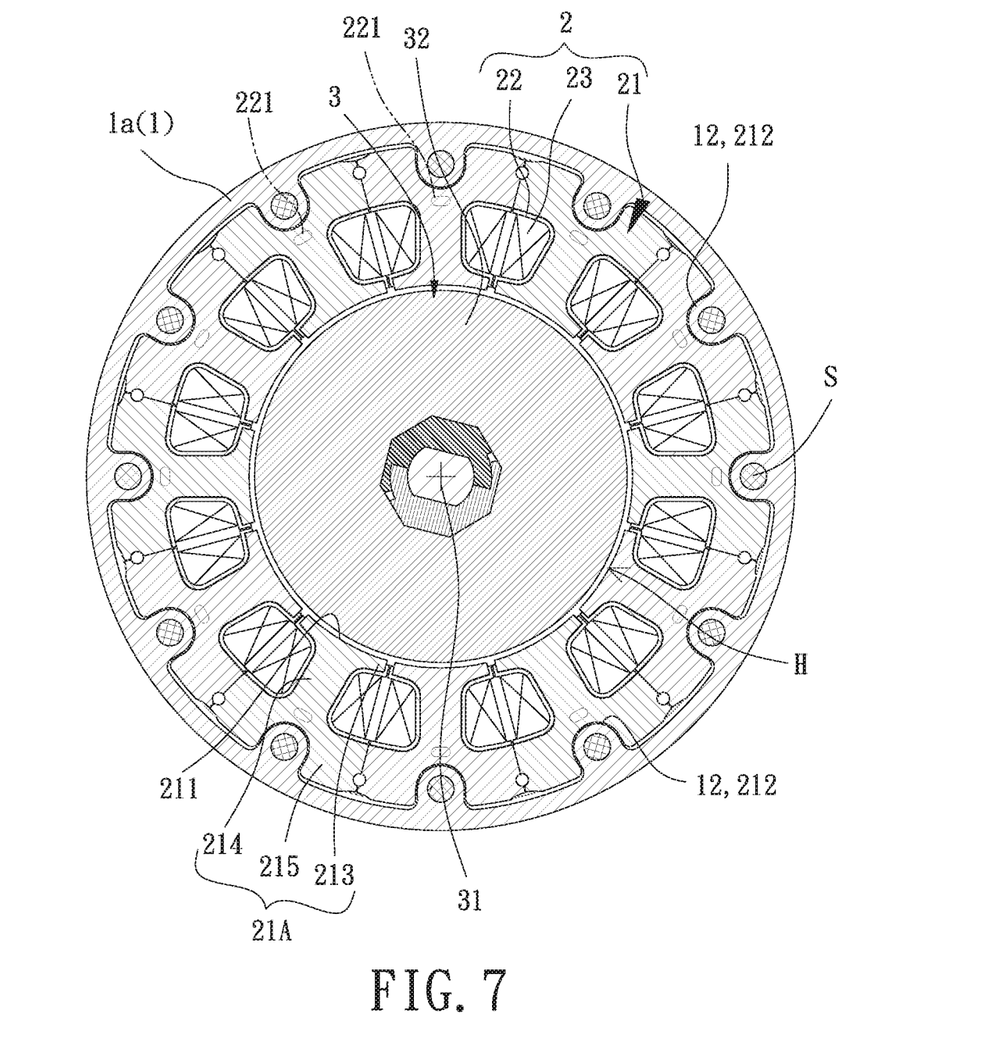
FIG. 7 is a transverse, cross sectional view of an inner-rotor motor using another type of rotor.

In the embodiment, the rotor 3 includes two bearings 33 coupled with the housing 1. The magnet portion 32 is arranged between the two bearings 33. The shaft 31 extends through the two bearings 33 and the magnet portion 32. The shaft 31 includes one end passing through the shaft hole 11 of the first housing part 1a and extending out of the housing 1. As such, a magnetic field can be induced between the magnet portion 32 and the magnetic conduction face 211 of the iron core 21, driving the shaft 31 to rotate. It is noted that the structure of the rotor 3 is not limited. Namely, the rotor 3 as shown in FIG. 7 can also be used in the inner-rotor motor.

Figure 6:
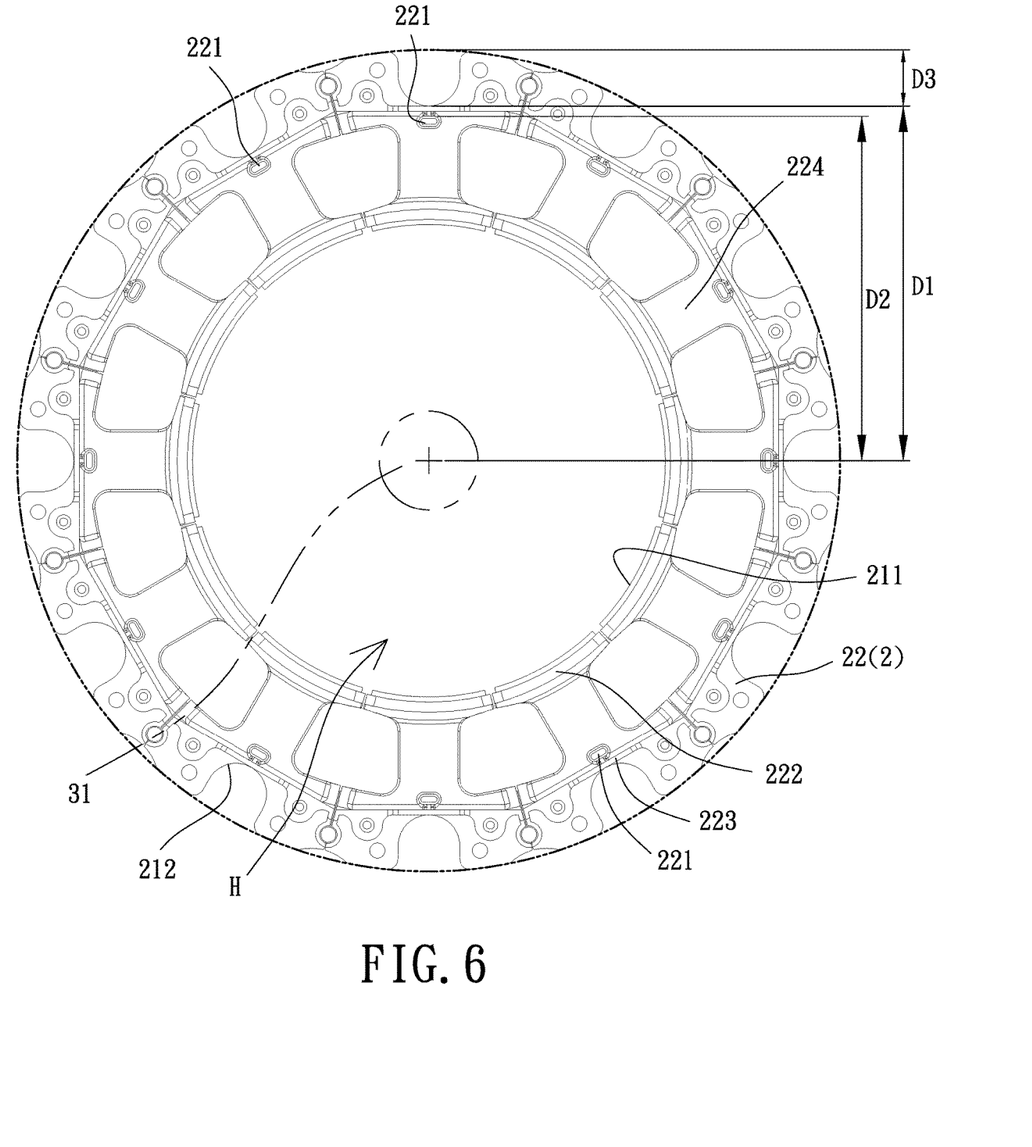
FIG. 6 is a top view of the assembled iron core and insulating sleeve of the stator according to the embodiment of the invention.

Referring to FIGS. 3 and 6, in a radial direction perpendicular to the shaft 31, the center of the shaft 31 is spaced from the notch 212 at a minimal distance D1, the center of the shaft 31 is spaced from the positioning member 221 at a maximal distance D2, and the notch 212 has a depth D3 which is defined by the difference between the maximum radius of the stator 2 and the minimal distance D1. The maximal distance D2 is smaller than the minimal distance D1, and the distance difference between the minimal distance D1 and the maximum distance D2 is smaller than the depth D3.

Based on this structure, referring to FIGS. 3 and 5, it can be ensured that the portion of the coil unit 23 that is wound around each pole portion 214 is spaced from the outer periphery of the stator 2 at a sufficient distance, and that at least one enameled copper wire 231 of the coil unit 23 that is fixed to the positioning member(s) 221 is also spaced from the outer periphery of the stator 2 at a sufficient distance. Therefore, when the iron core 21 is placed into the first housing part 1a, assembly simply requires the protrusions 12 to be aligned with the notches 212. In this case, the enameled copper wire(s) 231 of the coil unit 23 will not be scratched during assembly between the iron core 21 and the first housing part 1a, attaining an efficient assembly and a higher yield rate.

Referring to FIGS. 3, 4 and 6, the insulating sleeve 22 may further include a plurality of base plates 224, a plurality of inner walls 222 and a plurality of outer walls 223. Each base plate 224 has an inner surface and an outer surface. Each inner surface of the plurality of base plates 224 is coupled with the iron core 21, and the coil unit 23 is wound on the outer surfaces of the plurality of base plates 224. The iron core 21 includes two ends spaced from each other in an axial direction of the iron core 21. At one of the two ends of the iron core 21, one of the inner walls 222 and one of the outer walls 223 are arranged for each pole portion 214. Similarly, at each of the two ends of the iron core 21, one of the inner walls 222 and one of the outer walls 223 are arranged for each pole portion 214. As such, the coil unit 23 can be retained between the inner walls 222 and the outer walls 223. The inner wall 222 is closer to the central hole H than the outer wall 223 is to the central hole H. The inner wall 222 of the insulating sleeve 22 may be located on the boot portion 213 of the core unit 21A, and the outer wall 223 may be located on the magnetic yoke portion 215 of the core unit 21A. In this embodiment, each of the plurality of positioning members 221, each of the plurality of inner walls 222 and each of the plurality of outer walls 223 are protruded from a respective one of the outer surface of the plurality of base plates 224 in the direction away from the iron core 21 and in the axial direction of the iron core 21. In this embodiment, the positioning member 221 may be located between the inner wall 222 and the outer wall 223, such that the entire coil unit 23 can be located between the inner walls 222 and the outer walls 223. As such, the outer walls 223 can keep the coil unit 23 from the first housing part 1a during assembly, avoiding scratching of the coil unit 23. Thus, the assembly efficiency and yield rate is further improved. In a preferred case, the positioning member 221 is arranged on the outer wall 223 to improve its structural strength.

The positioning member 221 of the insulating sleeve 22 is preferably located on the magnetic yoke portion 215 of the core unit 21A, so that the positioning member 221 will not interfere with the winding operation of the coil unit 23. Besides, the outer wall 223 preferably is contiguous with the part of the bottom wall of the notch 212 that is closest to the central hole, to provide a larger room for arrangement of the positioning member 221. Advantageously, a proper size of the positioning member 221 can be arranged to prevent breaking or deformation of the positioning member 221 resulting from an improperly small size. This facilitates fixing the enameled copper wire(s) 231 to the positioning member(s) 221.

In summary, in the inner-rotor motor of the invention, the insulating sleeve is provided with the positioning member(s) to which the enameled copper wire(s) can be fixed. Thus, it can be ensured that the enameled copper wire(s) is spaced from the outer periphery of the stator at a sufficient distance to prevent scratching of the enameled copper wire(s) during assembly of the motor. Thus, the difficulty in assembly of the motor can be reduced, effectively improving the assembly efficiency and the yield rate.

Although the invention has been described in detail with reference to its presently preferable embodiments, it will be understood by one of ordinary skill in the art that various modifications can be made without departing from the spirit and the scope of the invention, as set forth in the appended claims

What is claimed is:

1. An inner-rotor motor comprising:
    a housing having an inner periphery provided with a plurality of protrusions;
    a stator received in the housing and comprising an iron core, an insulating sleeve and a coil unit, wherein the iron core is in an annular form and has a central hole, wherein the iron core has an outer periphery provided with a plurality of notches, wherein the plurality of protrusions is capable of extending into the plurality of notches respectively, wherein the insulating sleeve is coupled with the iron core and comprises a plurality of positioning members, wherein the insulating sleeve comprises a plurality of base plates, each of the plurality of base plates has an inner surface and an outer surface, each inner surface of the plurality of base plates is coupled with the iron core, wherein at least one enameled copper wire is wound around the outer surfaces of the plurality of the base plates of the insulating sleeve to form the coil unit, wherein each of the at least one enameled copper wire is fixed to one of the plurality of positioning members, and wherein the plurality of positioning members is electrically insulative; and
    a rotor rotatably coupled with the housing via a shaft and comprising a magnet portion received in the central hole,
    wherein, in radial directions perpendicular to the shaft, each of the plurality of notches is spaced from a center of the shaft at a minimal distance, and each of the plurality of positioning members is spaced from the center of the shaft at a maximal distance, each of the plurality of notches has a depth defined by a difference between a maximum radius of the stator and the minimal distance, wherein the maximal distance is smaller than the minimal distance, and a distance difference between the minimal distance and the maximum distance is smaller than the depth,
    wherein the iron core forms a magnetic conduction face at an inner periphery thereof, wherein the iron core comprises a plurality of pole portions located between the magnetic conduction face and the plurality of notches, wherein the insulating sleeve covers the plurality of pole portions, wherein the coil unit is aligned with the plurality of pole portions, wherein the magnetic conduction face is in an uncovered state, and wherein the magnetic conduction face faces the magnet portion of the rotor,
    wherein the iron core comprises two ends spaced from each other in an axial direction of the iron core, wherein the insulating sleeve comprises a plurality of inner walls and a plurality of outer walls, wherein one of the plurality of inner walls and one of the plurality of outer walls are arranged for each of the plurality of pole portions at one or each of the two ends of the iron core, wherein each of the plurality of positioning members, each of the plurality of inner walls and each of the plurality of outer walls are protruded from a respective one of the outer surfaces of the plurality of base plates in a direction away from the iron core and in the axial direction of the iron core, wherein each inner wall is closer to the central hole than each outer wall is to the central hole, and wherein the plurality of positioning members is located between the plurality of inner walls and the plurality of outer walls,
    wherein each of the plurality of notches comprises a bottom wall having a part most adjacent to the central hole and first and second sides extending from opposite ends of the part of the bottom wall extending outward of the central hole, and wherein each outer wall is contiguous with the part of the bottom wall of a respective one of the plurality of notches, and
    wherein the plurality of outer walls is located outside the enameled copper wire in a radial direction of the iron core.

2. The inner-rotor motor as claimed in claim 1, wherein each of the plurality of notches is aligned with a respective one of the plurality of pole portions in a radial direction perpendicular to an axial direction of the central hole.

3. The inner-rotor motor as claimed in claim 1, wherein the plurality of positioning members is arranged on the plurality of outer walls, respectively.

4. The inner-rotor motor as claimed in claim 1, wherein the iron core comprises a plurality of core units, wherein each of the plurality of core units comprises a boot portion, a magnetic yoke portion, and one of the plurality of pole portions, wherein the boot portion, the one of the plurality of pole portions and the magnetic yoke portion are connected in series in a radial direction perpendicular to the axial direction of the central hole, wherein each inner wall of the insulating sleeve is located on the boot portion, and wherein each outer wall is located on the magnetic yoke portion.

5. The inner-rotor motor as claimed in claim 4, wherein each of the plurality of positioning members of the insulating sleeve is located on the magnetic yoke portion of a respective one of the plurality of core units.

6. The inner-rotor motor as claimed in claim 1, wherein the housing comprises a shaft hole, wherein the shaft of the rotor extends through the shaft hole, wherein the plurality of protrusions is spaced from each other in intervals and extends in parallel to the axial direction of the shaft hole, and wherein the plurality of notches extends in parallel to an axial direction of the central hole.

7. A stator comprising:

an iron core having an annular form and a central hole, wherein the iron core has an outer periphery forming a plurality of notches;

an insulating sleeve coupled with the iron core and having a plurality of positioning members, wherein the insulating sleeve comprises a plurality of base plates, each of the plurality of base plates has an inner surface and an outer surface, each inner surface of the plurality of base plates is coupled with the iron core, wherein the plurality of positioning members is electrically insulative; and a coil unit formed by at least one enameled copper wire wound around the outer surfaces of the plurality of the base plates of the insulating sleeve, wherein each of the at least one enameled copper wire is fixed to one of the plurality of positioning members;

wherein, in radial directions perpendicular to the central hole, each of the plurality of notches is spaced from a center of the central hole at a minimal distance, and each of the plurality of positioning members is spaced from the center of the central hole at a maximal distance, each of the plurality of notches has a depth defined by a difference between a maximum radius of the stator and the minimal distance, wherein the maximal distance is smaller than the minimal distance, and a distance difference between the minimal distance and the maximum distance is smaller than the depth, wherein the iron core forms a magnetic conduction face at an inner periphery thereof, wherein the iron core comprises a plurality of pole portions located between the magnetic conduction face and the plurality of notches, wherein the insulating sleeve covers the plurality of pole portions, wherein the coil unit is aligned with the plurality of pole portions, and wherein the magnetic conduction face is in an uncovered state, wherein the iron core comprises two ends spaced from each other in an axial direction of the iron core, wherein the insulating sleeve comprises a plurality of inner walls and a plurality of outer walls, wherein one of the plurality of inner walls and one of the plurality of outer walls are arranged for each of the plurality of pole portions at one or each of the two ends of the iron core, wherein each of the plurality of positioning members, each of the plurality of inner walls and each of the plurality of outer walls are protruded from a respective one of the outer surfaces of the plurality of base plates in a direction away from the iron core and in the axial direction of the iron core, wherein each inner wall is closer to the central hole than each outer wall is to the central hole, and wherein the plurality of positioning members is located between the plurality of inner walls and the plurality of outer walls, wherein each of the plurality of notches comprises a bottom wall having a part most adjacent to the central hole and first and second sides extending from opposite ends of the part of the bottom wall extending outward of the central hole, and wherein each outer wall is contiguous with the part of the bottom wall of a respective one of the plurality of notches, and wherein the plurality of outer walls is located outside the enameled copper wire in a radial direction of the iron core.

8. The stator as claimed in claim 7, wherein each of the plurality of notches is aligned with a respective one of the plurality of pole portions in a radial direction perpendicular to an axial direction of the central hole.

9. The stator as claimed in claim 7, wherein the plurality of positioning members is arranged on the plurality of outer walls, respectively.

10. The stator as claimed in claim 7, wherein the iron core comprises a plurality of core units, wherein each of the plurality of core units comprises a boot portion, a magnetic yoke portion, and one of the plurality of pole portions, wherein the boot portion, the one of the plurality of pole portions, and the magnetic yoke portion are connected in series in a radial direction perpendicular to the axial direction of the central hole, wherein each inner wall of the insulating sleeve is located on the boot portion, and wherein each the outer wall is located on the magnetic yoke portion.

11. The stator as claimed in claim 10, wherein each of the plurality of positioning members of the insulating sleeve is located on the magnetic yoke portion of a respective one of the plurality of core units.

12. The stator as claimed in claim 7, wherein the plurality of notches extends in parallel to an axial direction of the central hole.

* * * * *